United States Patent
Bengtsson

(10) Patent No.: US 9,838,933 B2
(45) Date of Patent: Dec. 5, 2017

(54) STANDARDIZED INTER-BASE STATION REPORTING OF PILOT CONTAMINATION FOR IMPROVED PILOT RESOURCE RE-USE

(71) Applicant: Sony Corporation, Tokyo (JP)

(72) Inventor: Erik Bengtsson, Eslöv (SE)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 14/796,598

(22) Filed: Jul. 10, 2015

(65) Prior Publication Data
US 2016/0373985 A1 Dec. 22, 2016

Related U.S. Application Data

(63) Continuation of application No. PCT/EP2015/063737, filed on Jun. 18, 2015.

(51) Int. Cl.
*H04W 4/00* (2009.01)
*H04B 7/216* (2006.01)
(Continued)

(52) U.S. Cl.
CPC .......... *H04W 36/20* (2013.01); *H04B 7/0413* (2013.01); *H04J 11/0056* (2013.01);
(Continued)

(58) Field of Classification Search
CPC .. H04W 36/20; H04B 7/0413; H04J 11/0056; H04J 43/062
See application file for complete search history.

(56) References Cited

U.S. PATENT DOCUMENTS 6,295,290 B1 9/2001 Soderkvist et al.
8,774,150 B1 7/2014 Jeffery et al.
(Continued)

FOREIGN PATENT DOCUMENTS

WO 2008111781 A1 9/2008
WO 2011131822 A1 10/2011
(Continued)

OTHER PUBLICATIONS

International Search Report and Written Opinion; dated Mar. 4, 2015; issued in International Patent Application No. PCT/EP2014/077962.
(Continued)

*Primary Examiner* — Melanie Jagannathan
(74) *Attorney, Agent, or Firm* — James C. Edwards; Moore & Van Allen PLLC

(57) ABSTRACT

The invention is directed to systems, methods and computer program products for standardized inter-base station reporting of pilot contamination for improved pilot resource re-use. Specifically, possible pilot channel contamination is detected at first user equipment and, in response to the detection, a request is transmitted for the first user equipment to forego transmission during a next frame designated for transmitting a pilot signal. A determination is made within the next frame if other second user equipment, which are communicating with a neighboring base station, are transmitting on a same channel as a pilot channel of the first user equipment and, in response to such a determination, a report is sent to the neighboring base stations that indicates that the pilot channel on which the first user equipment is communicating is currently contaminated.

20 Claims, 7 Drawing Sheets

(51) Int. Cl.

| | | |
|---|---|---|
| *H04W 36/20* | (2009.01) | |
| *H04J 11/00* | (2006.01) | |
| *H04B 7/0413* | (2017.01) | |
| *H04L 12/26* | (2006.01) | |
| *H04W 24/08* | (2009.01) | |
| *H04W 72/04* | (2009.01) | |
| *H04W 72/12* | (2009.01) | |

(52) U.S. Cl.
 CPC ........ *H04J 11/0059* (2013.01); *H04L 43/062* (2013.01); *H04W 24/08* (2013.01); *H04W 72/0406* (2013.01); *H04W 72/1231* (2013.01)

(56) References Cited

U.S. PATENT DOCUMENTS

| | | | |
|---|---|---|---|
| 2002/0004920 A1 | 1/2002 | Cho et al. | |
| 2004/0131030 A1 | 7/2004 | Kuroyanagi et al. | |
| 2006/0256761 A1 | 11/2006 | Meylan et al. | |
| 2007/0082619 A1 | 4/2007 | Zhang et al. | |
| 2007/0207828 A1 | 9/2007 | Cheng et al. | |
| 2008/0130483 A1* | 6/2008 | Khandekar | H04L 5/0007 370/208 |
| 2008/0220791 A1 | 9/2008 | Cho et al. | |
| 2008/0298524 A1 | 12/2008 | Koorapaty et al. | |
| 2009/0109939 A1* | 4/2009 | Bhushan | H04W 72/082 370/337 |
| 2009/0130980 A1 | 5/2009 | Palanki et al. | |
| 2009/0154540 A1 | 6/2009 | Yu et al. | |
| 2009/0180435 A1 | 7/2009 | Sarkar | |
| 2009/0268679 A1 | 10/2009 | Suga | |
| 2010/0106828 A1* | 4/2010 | Palanki | H04L 1/0028 709/224 |
| 2010/0151873 A1* | 6/2010 | Gorokhov | H04W 72/042 455/452.1 |
| 2010/0234061 A1 | 9/2010 | Khandekar et al. | |
| 2010/0272032 A1 | 10/2010 | Sayana et al. | |
| 2010/0311450 A1 | 12/2010 | Rinne et al. | |
| 2010/0322100 A1 | 12/2010 | Wan et al. | |
| 2011/0086663 A1* | 4/2011 | Gorokhov | H04W 52/325 455/522 |
| 2011/0280223 A1 | 11/2011 | Maeda et al. | |
| 2013/0100823 A1 | 4/2013 | Ren et al. | |
| 2013/0201967 A1 | 8/2013 | Nentwig | |
| 2013/0265896 A1 | 10/2013 | Mallik et al. | |
| 2013/0294268 A1 | 11/2013 | Xu et al. | |
| 2014/0098704 A1 | 4/2014 | Wang | |
| 2015/0103711 A1 | 4/2015 | Hong et al. | |
| 2015/0229459 A1* | 8/2015 | Ashikhmin | H04L 5/0032 370/278 |
| 2016/0029429 A1 | 1/2016 | Peng et al. | |

FOREIGN PATENT DOCUMENTS

| | | |
|---|---|---|
| WO | 2013116762 A1 | 8/2013 |
| WO | 2013165282 A1 | 11/2013 |

OTHER PUBLICATIONS

Boris Kouassi et al., "Design and Implementation of Spatial Interweave LTE-TDD Cognitive Radio Communication on an Experimental Platform", IEEE Wireless Communications, IEEE Service Center, Piscataway, NJ, US, vol. 20, No. 2, Apr. 1, 2013, pp. 60-67, XP011505963.

R. Rogalin et al., "Scalable Synchronization and Reciprocity Calibration for Distributed Multiuser MIMO", IEEE Transactions on Wireless Communications, IEEE Service Center, Piscataway, NJ, US, vol. 13, No. 4, Apr. 1, 2014, pp. 1815-1831, XP011546291.

Erik Larsson et al., "Massive MIMO for Next Generation Wireless Systems", IEEE Communications Magazine, IEEE Service Center, Piscataway, US, vol. 52, No. 2, Feb. 1, 2014, pp. 186-195 XP011539689.

International Search Report and Written Opinion; dated Feb. 27, 2015; issued in International Patent Application No. PCT/EP2014/077965.

Larson Erik et al., "Massive MIMO for Next Generation Wireless Systems", IEEE Communications Magazine, IEEE Service Center, Piscataway, US, vol. 52, No. 2, Feb. 1, 2014, pp. 186-195, XP011539689, ISSN: 0163-6804, DOI: 10.1109/MCOM.2014.6736761 [retreived on Feb. 10, 2014].

International Search Report and Written Opinion; dated Oct. 7, 2015; issued in International Patent Application No. PCT/EP2015/063737.

* cited by examiner

STANDARDIZED INTER-BASE STATION REPORTING OF PILOT CONTAMINATION FOR IMPROVED PILOT RESOURCE RE-USE

FIELD OF THE INVENTION

In general, embodiments of the invention relate to mobile communication network communications and, more particularly, systems and methods for standardized inter-base station reporting of pilot contamination for improved pilot resource re-use.

BACKGROUND

Multiple-input and multiple-output ("MIMO") is the use of multiple antennas at both a transmitter (e.g., a base Station "BS" and/or user equipment "UE", otherwise referred to as a mobile device) and a receiver (e.g., a BS and/or UE) in order to improve wireless communication between the transmitter and the receiver. Massive MIMO, otherwise referred to as a MaMi network, refers to using a large number of antennas (e.g., equal to or greater than a threshold number) at the transmitter, receiver or both. For example a base station may have hundreds of antennas, arranged in an antenna array, while the user equipment will have at least one and, optionally, two to four antennas.

In order to calibrate the antennas in a MaMi network and focus energy to the UEs from the antennas, thereby maximizing antenna gain, the UEs transmit a pilot signal, in a dedicated time slot, which is listened for by all the antennas at the BS. In response to receiving the pilot signal, the BSs will record details of the RF signal (e.g., reflections, delays, phase, etc.) as a means of reading the wireless channel (e.g., determining delays, echoes and the like in the wireless channel) on which the UE is communicating. The BS uses this information to configure the BS's antennas in the digital domain and provide the antennas with appropriate signals (i.e., signals having appropriate, amplitude, phase, reflections and the like). As a result when the BS transmits signals to the UE, the BS only transmits signals (and listens for signals) in the direction from where the BS received signals. In the MaMi network this results in high antenna gain, i.e., multiple directional beams being transmitted simultaneously with the appropriate delays, which results in focused energy at the UE and optimal polarization at the UE.

The validity of the pilot signal that is transmitted from the UE is very time limited (i.e., time coherency is minimal). If the UE is moved a short distance the pilot signal will no longer be valid and the channel will appear different. Therefore, the pilot signal needs to be transmitted on the uplink frequently (e.g., once every millisecond (ms) or the like). The benefit of such frequent transmission is that the RF energy improves, approximately, by a factor of 100 and the spectral efficiency improves, approximately, by a factor of 10. In other words, the same frequency/channel can be re-used for up to 10 UEs simultaneously.

If the pilot signal is not being received properly by the antennas at the BS, due to disturbance, interference or the like, the BS is incapable of calculating the channels and otherwise optimizing the wireless network. For example, what is referred to herein as pilot contamination or interference can result from a UE (i.e., the contaminated UE) transmitting their pilot signal during their designated time slot, while another UE is transmitting on the same frequency/channel at the same time (i.e., simultaneously on the same pilot channel). When this occurs the BS is unable to differentiate between the two signals.

Therefore, a need exists to improve performance of the uplink pilot signal, so that better overall MaMi network performance can be realized in the form of improved channel estimate. In this regard, a need exists to address problems associated with pilot contamination, specifically, addressing the need to keep inter-cell interference low while, at the same time, keeping the spectral efficiency high.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for standardized inter-base station reporting of pilot contamination for improved pilot resource re-use. Specifically, possible pilot channel contamination is detected at a first user equipment (UE1) that is communicating with a first base station (BS1). Pilot channel contamination as used herein is defined as interference in the pilot signal caused by another UE, which is in communication with a neighboring base station, communicating on the same channel as pilot signal channel during the frame designated for transmitting the pilot signal. In specific embodiments of the invention, possible pilot channel contamination may be detected by an increase in the bit error rate (BER) in the downlink signal (BS1 transmissions to UE1) or the uplink signal (UE1 transmissions to BS1).

In response to determination of the possible pilot channel contamination, BS1 listens for contamination in the next frame designated for transmitting the pilot signal. In specific embodiments of the invention, listening for contamination includes transmitting a request to UE1 for UE1 to forego transmission during a next frame designated for transmitting a pilot signal and, BS1 determines within the next frame if one or more second user equipment (UE2s), which are communicating with a neighboring second base station (BS2), are transmitting on a same channel as a pilot channel of UE1. A neighboring base station as used herein is defined as a base station that shares an edge of their corresponding cell with another base station or, stated differently, has overlap in coverage area.

If contamination of the pilot signal is confirmed (i.e., a determination is made that one or more one or more second base stations (BS2s), which are communicating with a neighboring second base station (BS2), are transmitting on a same channel as a pilot channel of UE1), BS1 may, according to specific embodiments of the invention, report to the BS2s that the pilot channel on which UE1 is communicating is currently contaminated.

In specific embodiments of the inventions, in response to receiving the report indicating the contaminated pilot channel, actions may be taken at BS2s to mitigate the contamination by re-allocating resources (e.g., allocating an alternative channel resource to contaminating UE2, rearranging resources or the like). In alternate embodiments of the invention, actions may be taken at BS1 to attempt to mitigate the contamination prior to communicating the report to BS2s indicating the contaminated pilot channel. In such embodiments, if the mitigation action at BS1 is successful, communication of the report to BS2s indicating the contaminated pilot channel may be obviated. Re-allocation/re-use of resources is especially important in a MaMi communication network as the spectral efficiency is directly dependent on the number of orthogonal pilots available.

A system for improving performance in a MaMi (Massive Multiple Input Multiple Output (MIMO)) communication network defines first embodiments of the invention. The system includes a first Base Station (BS1) in network communication with a first User Equipment (UE1). At least one of the BS1 and the UE1 are configured to detect possible pilot channel contamination of the UE1. In response to detecting the possible pilot channel contamination, the BS1 is configured to transmit to the UE1 a request to forego transmission during a next frame designated for transmitting a pilot signal.

The system further includes a plurality of second Base Stations (BS2) that neighbor the BS1 and are in network communication with one or more second User Equipment (UE2). BS1 is further configured to (i) determine within the next frame if one or more of the UE2s are transmitting on a same channel as a pilot channel of the UE1, and (ii) in response to determining that one or more of the UE2s are transmitting on the same channel, report to the BS2s that the pilot channel on which the UE1 is communicating is currently contaminated.

In specific embodiments of the system, the BS2s are configured to, in response to the BS2s receiving the report that the pilot channel is currently contaminated, determine that one or more of the UE2s are currently communicating with the BS2 on the same channel as the pilot channel, and allocate a different channel resource to the one or more UE2s. In other related embodiments of the system, the BS1 is further configured to, in lieu of reporting to the BS2s that the pilot channel is currently contaminated, allocate a different pilot channel resource to the UE1.

In other specific embodiments of the system, the BS1 is further configured to (i) determine that the BS1 has priority over the pilot channel, and (ii) in response to determining that the BS1 has priority over the pilot channel, report to the BS2s that the pilot channel on which the UE1 is communicating is currently contaminated. In such embodiments of the system, the BS1 may be further configured to determine that the BS1 has no available priority channels for allocating to the UE1, and (ii) in response to determining that the BS1 has no available priority channels for allocating to the UE1, report to the BS2s that the pilot channel on which the UE1 is communicating is currently contaminated.

In still further specific embodiments of the system, the UE1 or the BS1 is further configured to detect the possible pilot channel contamination of the UE1 by detecting an increase in one of uplink (UL) or downlink (DL) bit error rate (BER). In specific embodiments of the system, the UE1 is further configured to detect the increase in downlink BER and transmit notification of the increase in BER to the BS1.

In yet other specific embodiments of the system, the BS1 is further configured to, in response to determining that no UE2s are transmitting on the same channel as the pilot channel, increase a power level to the UE1.

A method for improving performance in a MaMi communication network defines second embodiment of the invention. The method includes detecting, at one of a first User Equipment (UE1) or a first Base Station (BS1) within the communication network, possible pilot channel contamination of UE1. In response to detecting the possible pilot channel contamination, the method further includes transmitting, from the BS1 to the UE1, a request for the UE1 to forego transmission during a next frame designated for transmitting a pilot signal. Further, the method includes determining, at the BS1, within the next frame if one or more second user equipment (UE2), which are communicating with a neighboring second base station (BS2), are transmitting on a same channel as a pilot channel of the UE1. In response to determining that the one or more UE2s are transmitting on the same channel, the method further includes reporting, by the BS1, to the one or more BS2s the identity of the contaminated pilot channel.

In specific embodiments the method further includes, in response to reporting to the BS2s that the pilot channel is currently contaminated, determining, at a BS2, that one or more UE2s are currently communicating with the BS2 on the same channel as the pilot channel, and allocating, by the BS2, a different channel resource to the one or more UE2s.

In other specific embodiments the method further includes, in lieu of reporting to the BS2s that the pilot channel is currently contaminated, allocating, by the BS1, a different pilot channel resource to the UE1.

In other specific embodiments the method further includes, in response to reporting to the BS2s that the pilot channel is currently contaminated, determining which one of the base stations (BS1 and BS2s) has priority over the pilot channel and allocating different channel resources at all other BSs than the base station having priority over the pilot channel.

In still further specific embodiments the method further includes determining that the BS1 has priority over the pilot channel and, in such embodiments, reporting to the one or more BS2s occurs in response to determining that the BS1 has priority over the pilot channel. In related embodiments the method further includes determining that the BS1 has no available priority channels for allocating to the UE1 and, in such embodiments, reporting to the one or more BS2s occurs in response to determining that the BS1 has no available priority channels for allocating to the UE1.

Moreover, in other specific embodiments of the method, detecting possible pilot channel contamination of the UE1 further includes detecting, at one of the UE1 or the BS1, an increase in one of uplink (UL) or downlink (DL) bit error rate (BER). In such embodiments of the method, detecting the increase in BER may further include determining that the BER meets or exceeds a predetermined bit error rate threshold. In other such embodiments of the method, detecting the increase in BER further includes periodically performing a check for increase in BER in at least one of uplink signals or downlink signals.

In yet other specific embodiments the method further includes, in response to determining that no UE2s are transmitting on the same channel, increasing a power level to the UE1.

Another method for improving performance in a MaMi communication network defines third embodiments of the invention, The method includes, in response to detecting possible pilot channel contamination of first User Equipment (UE1), receiving, at the UE1, a request from a first base station (BS1) for the UE1 to forego transmission during a next frame designated for transmitting a pilot signal. The method further includes, in response to receiving the request, foregoing, by the UE1, transmission of the pilot signal during the next frame. The BS1 (i) determines within the next frame that one or more second user equipment (UE2), which are communicating with a neighboring second base station (BS2) are transmitting on a same channel as a pilot channel of the UE1 and (ii) in response to determining that the one or more UE2s are transmitting on the same channel, reports to the one or more BS2s that the pilot channel on which the UE1 is communicating is currently contaminated.

Thus, systems, apparatus, methods, and computer program products herein described in detail below provide for standardized inter-base station reporting of pilot contamination for improved pilot channel re-use/re-allocation. The present invention detects possible pilot channel contamination in a user equipment and, in response to detecting the possible pilot signal confirmation, confirms the pilot channel contamination by requesting that the user equipment remain silent (i.e., not transmit) during a next frame designated for pilot signal transmission. If the BS confirms the pilot signal transmission by determining within the next frame, that one or more other user equipment, which are communicating with a neighboring second base station, are transmitting on a same channel as a pilot channel of the user equipment, then the base station sends a report to the neighboring base stations that indicates that the pilot channel being implemented by the user equipment is contaminated. Actions may be taken at the base station prior to sending the report or at the neighboring base stations upon receipt of the report to mitigate the contamination (i.e., re-use/re-allocate channel resources, rearrange allocation of channel resources or the like)

BRIEF DESCRIPTION OF THE DRAWINGS

Figure 1:
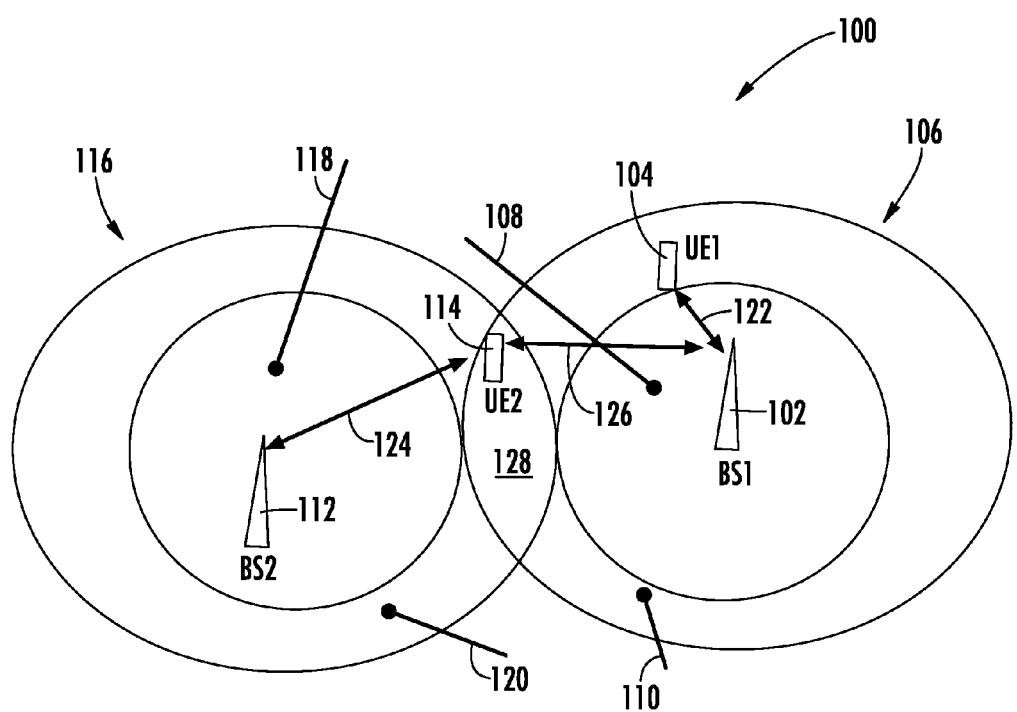
Figure 2:
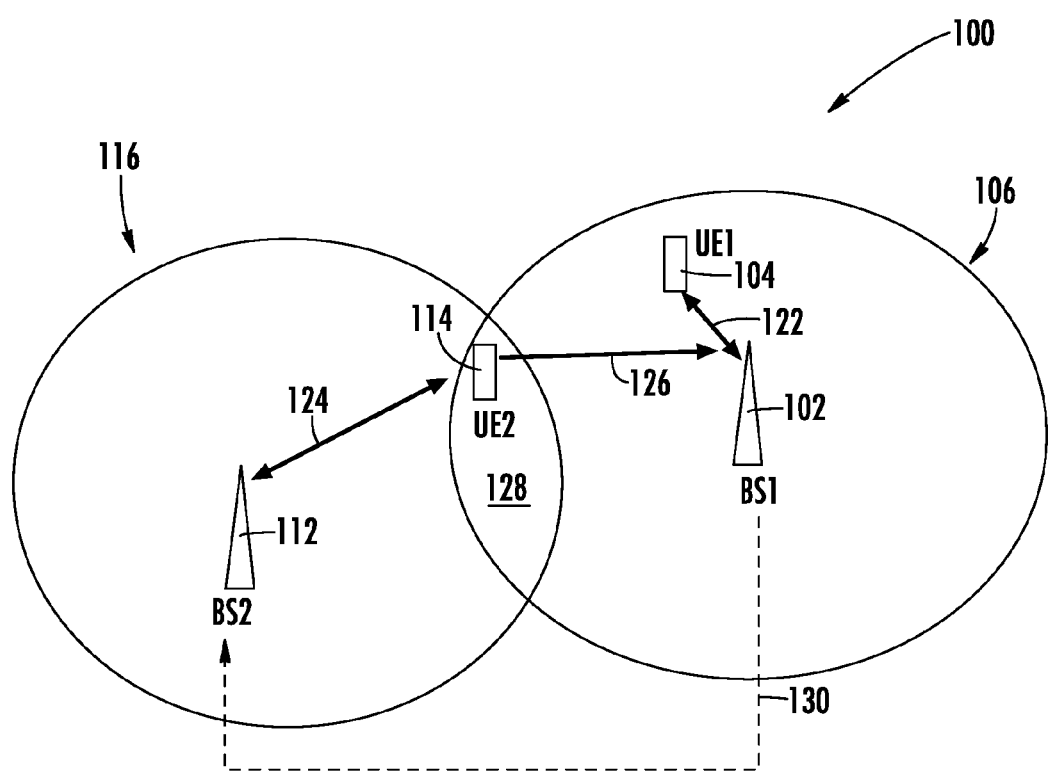
Figure 3:
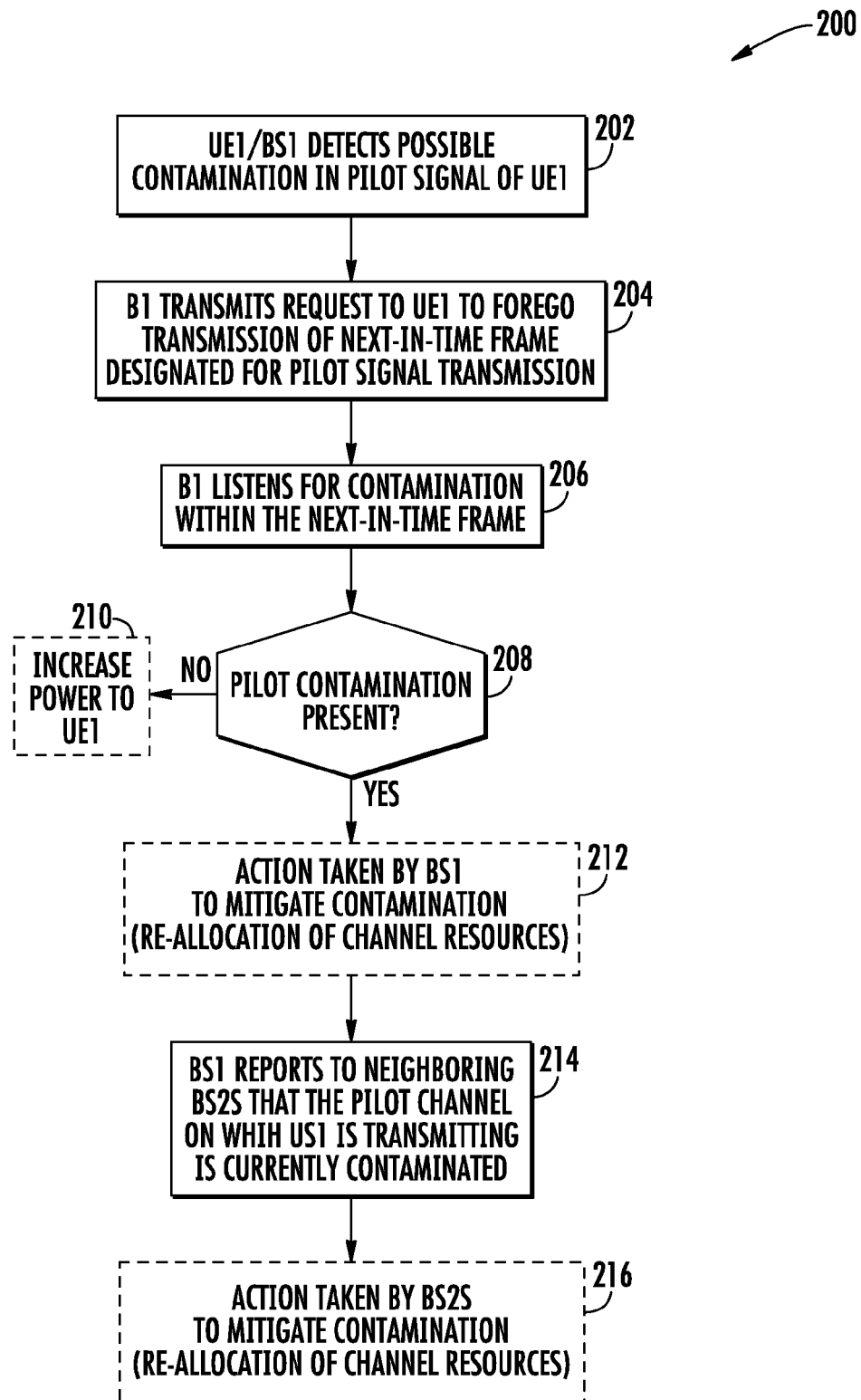
Figure 4:
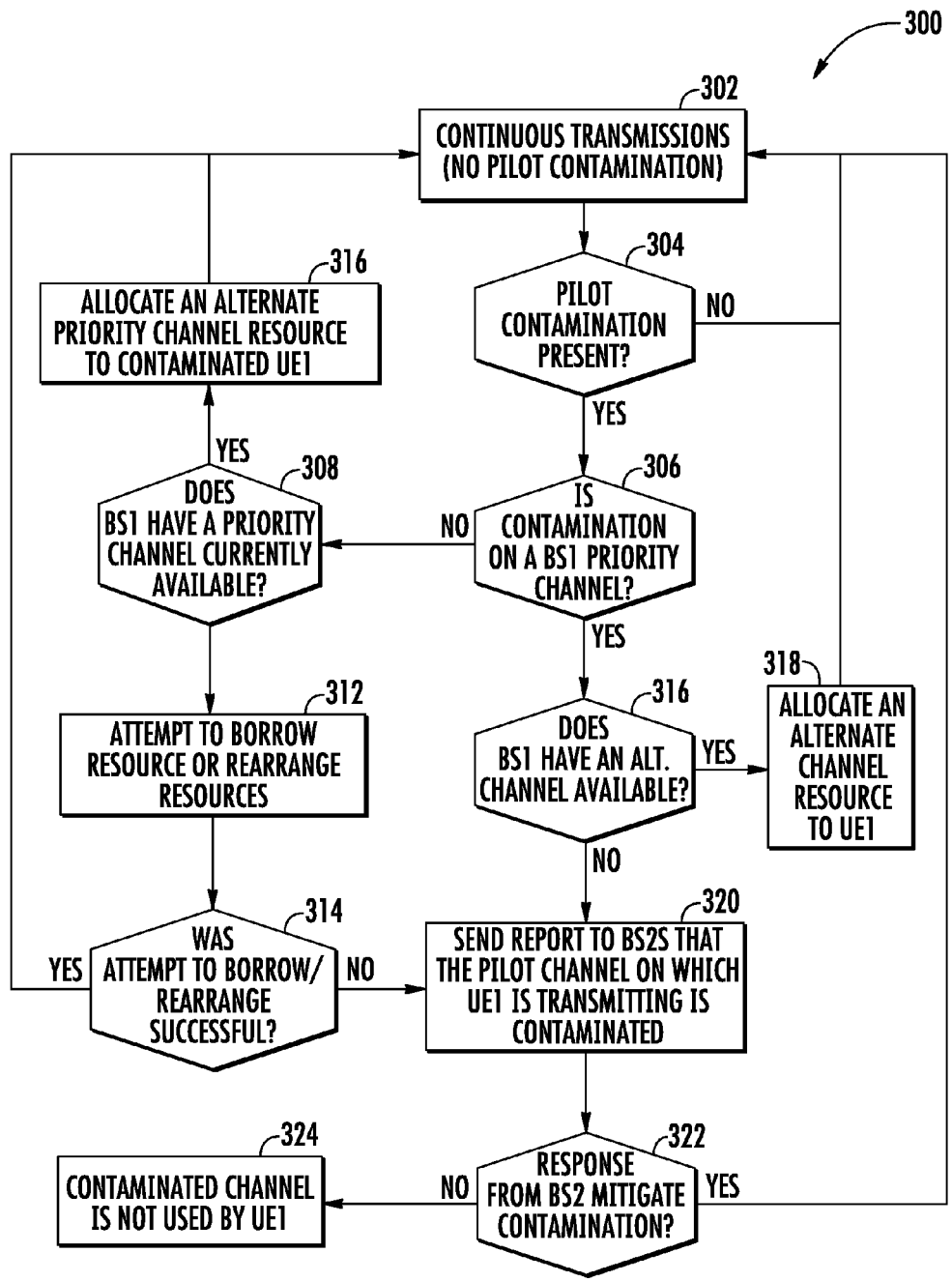
Figure 5:
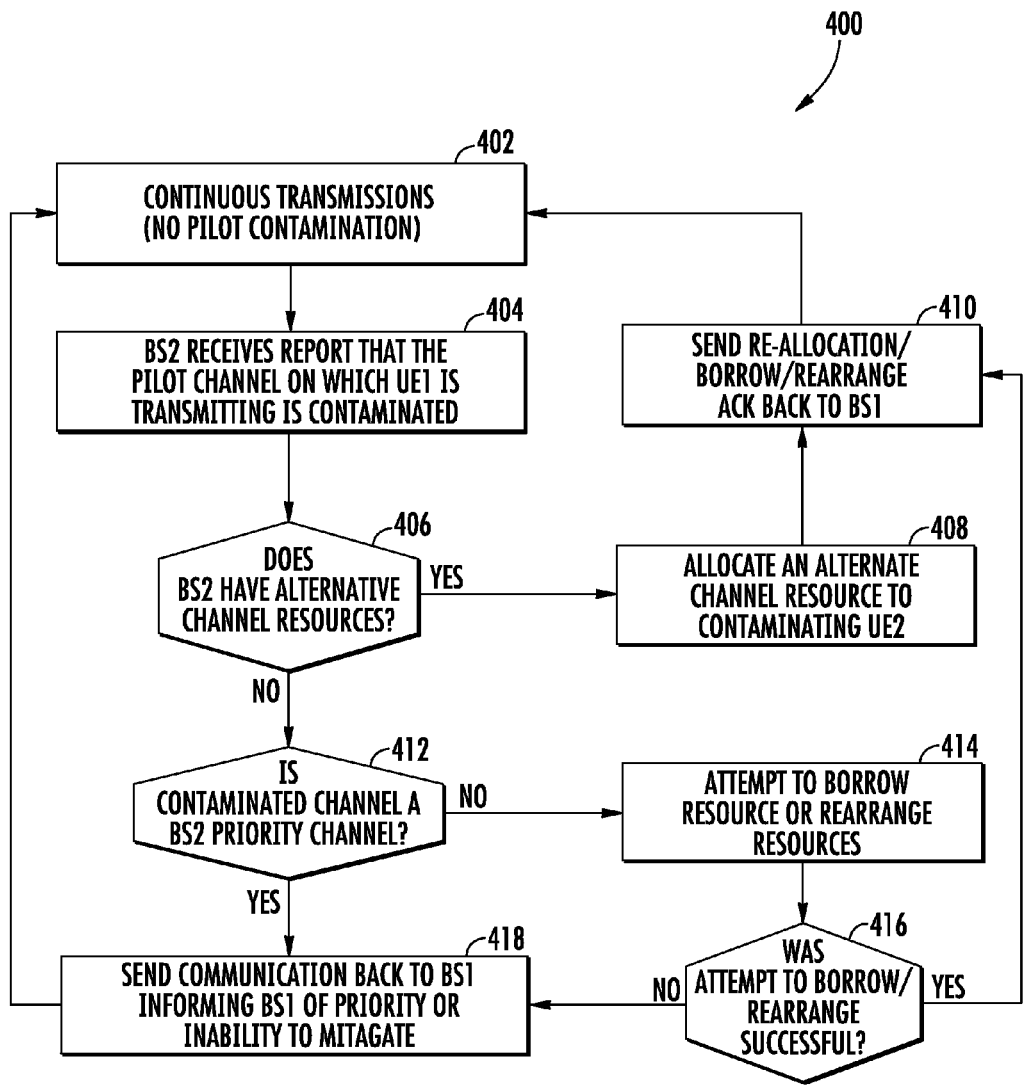
Figure 6:
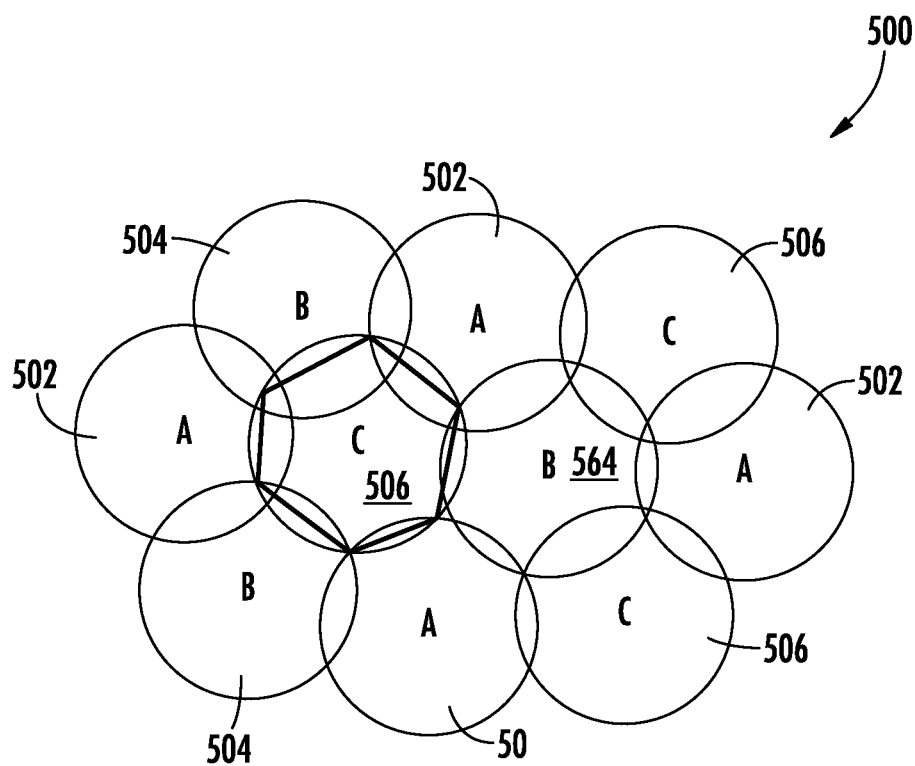
Figure 7:
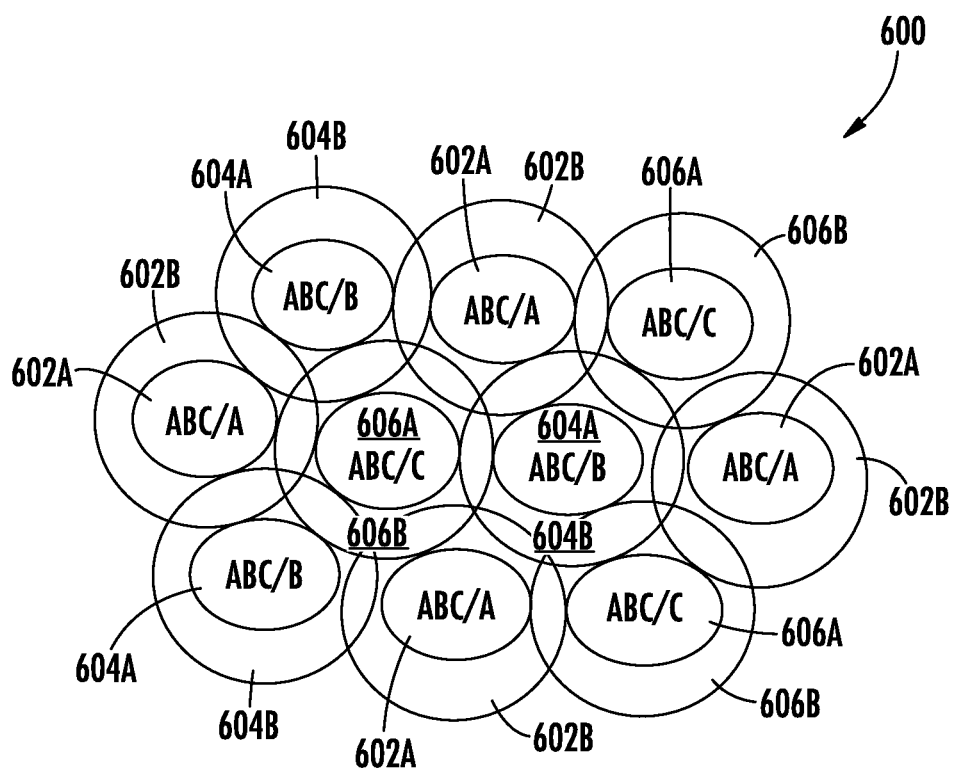

Having thus described embodiments of the invention in general terms, reference will now be made to the accompanying drawings, where:

FIG. 1 is a schematic diagram illustrating two cells in MaMi (Massive MIMO) communication network, in accordance with embodiments of the present invention;

FIG. 2 is a schematic diagram illustrating a user equipment (UE) having a contaminated pilot signal and reporting to neighboring base stations (BSs), in accordance with embodiments of the present invention;

FIG. 3 is a flow diagram of a method for determining pilot channel contamination within a UE and reporting of such to neighboring BSs, in accordance with embodiments of the present invention;

FIG. 4 is a flow diagram of a method for performing actions at a BS to mitigate pilot channel contamination prior to reporting the pilot channel contamination to neighboring BSs, in accordance with embodiments of the present invention;

FIG. 5 is a flow diagram of a method for performing actions at neighboring BSs to mitigate pilot channel contamination after receiving a report of pilot channel contamination, in accordance with embodiments of the present invention;

FIG. 6 is a schematic diagram of the orthogonal arrangement of cells in a MaMi communication network, in accordance with embodiments of the present invention; and FIG. 7 is a schematic diagram of illustrating resource allocation within cell centers and dedicated resource allocation at the periphery/edge of each cell within a MaMi communication network, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A network may be based on one or more network topologies. In an infrastructure topology, a network comprises a central device (a base station or "BS", otherwise referred to as an access point) and one or more connected devices (user equipment or "UE") that communicate with the BS and communicate with other connected devices via the BS. In other embodiments, the network may be based on other network topologies, such as a peer-to-peer ("P2P") topology or a mesh network topology.

As discussed in detail herein, the present invention provides for standardized inter-Base Station (BS) reporting of pilot channel contamination for improved pilot channel re-use/re-allocation in a MaMi (Massive MiMO) communication network. The inventive concepts herein disclosed take into account the assumption that in a MaMi communication network cells are synchronized and that the header portion of frames occur essentially simultaneously. The concept of re-use, otherwise referred to herein as reallocation of resources/channels, is specifically important in a MaMi communication network since the spectral efficiency of the network is directly dependent on the number of orthogonal pilots available.

FIG. 1 is a schematic diagram of a two neighboring cells in a MaMi communication network 100, in accordance with embodiments of the present invention. First communication cell 106 comprises first Base Station (BS1) 102 which is connected, via wireless link 122, to first User Equipment (UE1) 104. Second communication cell 116 comprises second Base Station (BS2) 112 which is connected, via wireless link 124, to second User Equipment (UE2). Each communication cell 106 and 116 includes a cell center 108 and 118, respectively, and a cell edge (or cell periphery) 110 and 120, respectively. While cell centers 108 and 118 and cell edges 110 and 120 are depicted in FIG. 1 as finite geographic areas occupying circular regions, in reality, cell centers 108 and 118 and cell edges 110 and 120 will comprise indefinite geographic areas that are dynamically defined in relation to the position of the UEs and other conditions in the network. As such, for the purpose of this disclosure, cell centers 108 and 118 are better defined as a condition with low intra-cell interference and cell edges are better defined as a condition for high intra-cell interference.

For example, if a UE is experiencing a cell center 108 or 118 condition, the possibility of inter-cell interference (i.e., signals from cell 116 interfering with cell 106 or vice versa) is relatively low since the power level provided by the UE is not being great enough to cause interference in the neighboring cell. However, as shown in FIG. 1, if a UE is experiencing a cell edge 110 or 120 condition, the possibility of inter-cell interference is relatively high since the power level provided by the UE is of a higher magnitude. Specifically, UE1 104 is experiencing a cell edge 110 condition and is prone to inter-cell interference from neighboring cell 116. Since UE2 114 is located in the overlapping region 128 that defines both cell edge 110 and 120 conditions, UE2 signals may be transmitted, via wireless link 126, between UE2 and BS1 and, thus cause interference with transmissions between UE1 and BS1.

FIG. 2 is a schematic diagram of a two neighboring cells in a MaMi communication network 100 in which the pilot channel used by UE1 104 is contaminated, in accordance with embodiments of the present invention. Similar to the two neighboring cells shown and described in relation to FIG. 1, FIG. 2 includes first communication cell 106 comprising first Base Station (BS1) 102 which is connected, via wireless link 122, to first User Equipment (UE1) 104 and second communication cell 116 comprising second Base Station (BS2) 112 which is connected, via wireless link 124, to second User Equipment (UE2). UE1 104 transmits pilot signals to BS1 102 on a designated pilot channel during a designated time slot or pilot channel. Since UE2 114 is located in the overlapping region 128 that defines cell edge conditions for both cell 106 and 116, UE2 signals may be received by BS1 and, thus cause interference with transmissions between UE1 and BS1. In particular embodiments of the invention, in which UE2 128 transmits signals on the same channel as the designated pilot channel of UE1 104 and during the designated time slot or on the same channel, the UE2 will interfere with, otherwise referred to herein as contaminate, the pilot signals transmitted by UE1 104. In accordance with embodiments of the invention herein disclosed, once BS1 confirms the contamination of the pilot channel used by UE1 104, BS1 102 will generate and communicate a report 130 to neighboring BS2s, including BS2 shown in FIG. 2, notifying the neighboring BS2s of the contaminated pilot channel. In turn, the BS2s that are connected with contaminating UE2s will attempt to perform mitigating actions to resolve the contaminated pilot channel issue, such actions, including, but not limited to, re-use/reallocation of resources/channels, borrowing resources/channels, rearranging the use of resources within their respective cell and the like.

Referring to FIG. 3 shown is a flow diagram of a method 200 for standardized inter-Base Station (BS) reporting of pilot channel contamination, in accordance with embodiments of the present invention. At Event 202, possible contamination of a User Equipment (UE1) pilot signal is detected. Contamination as used herein is defined as interference in the pilot signal caused by another user equipment (UE2), which is communicating with a neighboring Base Station (BS2) (i.e., a neighboring cell), transmitting on the same channel as pilot signal channel during the frame designated for UE1 to transmit the pilot signal. A neighboring base station as defined herein is any base station in which an edge of the cell associated with the base station is adjacent to and/or shared by the base station of note.

In specific embodiments of the invention, possible contamination in the pilot signal may be detected by an increase, in some embodiments a rapid or sudden increase, in the Bite Error Rate (BER) exhibited in either the uplink signals from UE1 to BS1 or the downlink signals from BS1 to UE1. In this regard, it is conceivable, and within the purview of the present invention for the increase in BER to detected either at UE1 or at BS1. In the event the UE1 detects the increase in BER, the UE is configured to notify BS1 of the increase in BER. In specific embodiments detecting an increase in BER may involve determining if the BER meets or exceeds a predetermined BER threshold, while in other embodiments the detection of the increase may be more dynamic and objective, taking into account current network conditions and the like. In specific embodiments, UE1 and/or BS1 may be configured to periodically, on an ongoing basis, check for the increase in BER. It should be noted that the invention is not limited to detecting possible pilot channel contamination by recognizing an increase in BER and that other means of detecting possible pilot channel contamination are contemplated and within the scope of the inventive concepts herein disclosed.

At Event 204, in response to detecting possible contamination of UE1 pilot signal, BS1 transmits a request for UE1 to forego transmission of a next-in-time frame designated for pilot signal transmission. In this regard, UE1 is silent (i.e., does not transmit) during the next-in-time frame during which UE1 would typically transmit the pilot signal. At Event 206, BS1 listens for contamination (i.e., signals from another user equipment (UE2), which is communicating with a neighboring base station (BS2)) during the next-in-time frame.

At Decision 208, a determination is made as to whether pilot channel contamination is present (i.e., whether one or more UE2s, which are communicating with a neighboring BS2, are transmitting on the same channel as the UE1 pilot channel during the fame designated for the UE1 to transmit the pilot signal). If a determination is made that the pilot signal is not contaminated, at Event 210, power to UE1 may be increased or some other action may be taken to address the increase in BER. It should be noted that in other embodiments of the invention, a determination that the pilot signal is not contaminated may result in other actions to mitigate the detection of possible contamination of the pilot signal (e.g., sudden increase in BER or the like) or may result in no actions being taken.

If a determination is made that contamination is present in the UE1 pilot signal, at optional Event 212, actions may be taken by BS1 to mitigate the contamination of UE1 pilot signal. The mitigating actions may include, but are not limited to, re-allocating a different pilot channel to UE, rearranging channel resources or the like. FIG. 4, discussed infra, provides a methodology for mitigating actions that may be taken at BS1. It should be noted that in certain instances mitigating actions may be attempting by BS1 but unsuccessful, prompting the need to report to neighboring BS2s (Event 214) the contamination of the UE1 pilot channel. It should also be noted that in certain embodiments, in the event that the mitigating actions taken by UE1 resolve issues associated with UI pilot channel contamination it may not be necessary to report to neighboring BS2s (Event 214) the contamination of the UE1 pilot channel.

At Event 214, BS1 reports to neighboring BS2s that the pilot channel on which UE1 is transmitting is currently contaminated. It should be noted that in certain embodiments of the invention, the report is communicated to all BS2s that neighbor BS1, while in other embodiments of the invention it may be possible to configure communication of the report to only those BS2s that are in communication with contaminating UE2s.

In response to receiving the report identifying the contaminated pilot channel, at optional Event 216, actions may be taken by BS2s to mitigate the contamination of UE1 pilot signal. The mitigating actions may include, but are not limited to, re-allocating a different pilot channel to UE, rearranging channel resources or the like. FIG. 5, discussed infra, provides a methodology for mitigating actions that may be taken at BS1.

Referring to FIG. 4 a flow diagram is depicted of a method 300 for attempting, at BS1, mitigating actions for pilot channel contamination and, in the event the pilot channel contamination cannot be mitigated at, communicating a report to neighboring BS2s that notifies BS2s of the contaminated pilot channel, in accordance with embodiments of the present invention. At Event 302, continuous transmissions are occurring between UE1 and BS1 with no apparent pilot contamination present (i.e., a normal state of transmission). At Decision 304, a determination is made as to whether UE1 pilot channel is currently contaminated. As discussed in relation to FIG. 3, such a determination may include detecting possible contamination in the pilot channel, e.g., detecting a sudden increase in BER or the like, and, subsequently, requesting that the UE remain silent during a next-in-time frame designated for pilot signal transmission and listening for contamination in the next-in-time frame. If no contamination is determined to be present, the method returns to Event 302 for normal state transmission of UE1 pilot signals.

If UE1 pilot channel contamination is determined to be currently present, at Decision 306, a determination is made as whether the contaminated channel is a BS1 priority channel (i.e., a channel in which BS1 has ownership rights or priority over other base stations). If the contaminated channel is not a BS1 priority channel, at Decision 308, a determination is made as to whether BS1 currently has a priority channel available for assignment. If a priority channel is determined to be currently available, at Event 310, the available priority channel is assigned to UE1 and the method returns to Event 302 for normal state transmission of UE1 pilot signals. If no priority channel is determined to be currently available, at Event 312, an attempt is made to borrow a resource/channel from another BS or rearrange existing resources. At Decision 314, a determination is made as to whether the attempt to borrow the resource/channel or rearrange resources was successful. If the attempt to borrow the resource/channel or rearrange the resource was successful the method returns to Event 302 for normal state transmission of UE1 pilot signals. If a determination is made that the attempt to borrow a resource/channel was unsuccessful, at Event 320, a report is communicated to the neighboring BS2s that identifies the pilot channel on which UE1 is transmitting as currently being contaminated.

Returning to Decision 306, if the contamination channel is a BS1 priority channel, at Decision 316, a determination is made as whether BS1 currently has an alternative channel available. If BS1 does currently have an alternative channel available, at Event 318, an alternative resource/channel is allocated to UE1 and the method returns to Event 302 for normal state transmission of the UE pilot signal. If BS1 does not currently have an alternative channel available, at Event 320, a report is communicated to the neighboring BS2s that identifies the pilot channel on which UE1 is transmitting as currently being contaminated.

In response to sending the report to the neighboring BS2s, at Decision 322, a determination is made as to whether a response is received from at least one of the BS2s that indicates that the contamination of UE1 pilot channel has been mitigated by actions taken at the BS2. If the response indicates that actions have been taken to mitigate the contamination of UE1 pilot channel, the method returns to Event 302 for normal state transmission of UE1 pilot signals. If the response indicates that actions have not been taken to mitigate the contamination of UE1 pilot channel, at Event 324, the contaminated channel is prohibited from being used by BS1.

Referring to FIG. 5 flow diagram is depicted of a method 400 for attempting, at BS2s, mitigating actions for pilot channel contamination, in accordance with embodiments of the present invention. At Event 402, continuous transmissions are occurring between UE1 and BS1 with no apparent pilot contamination present (i.e., a normal state of transmission). At Event 404, as result of determining that the UE1 pilot channel is contaminated, neighboring base stations (BS2s) receive a report that indicates that the pilot channel on which UE1 is transmitting is contaminated.

At Decision 304, a determination is made as to whether BS2 (i.e., the base station communicating the contaminating UE2) has alternative resources/channels available. If a determination is made that BS2 has an alternative resource/channel available, at Event 408 an alternative/resource is allocated/assigned to the contaminating UE2 and, at Event 410, a re-allocation acknowledgement is communicated back to BS1. Subsequently the method returns to Event 402 for normal state transmission of UE1 pilot signals.

If a determination is made that BS2 does not have alternative resources/channels available, at Decision 412, a determination is made as whether the contaminated channel is a BS2 priority channel (i.e., whether BS2 has ownership rights in the contaminated channel). If a determination is made that the contaminated channel is not a BS2 priority channel, at Event 414 an attempt is made to borrow resources from another BS or rearrange existing resources. At Decision, 416 a determination is made as to whether the attempt to borrow resources/channels or rearrange resources was successful. If the attempt to borrow the resource/channel or rearrange the resource was successful, at Event, a borrow/rearrange acknowledgement is communicated back to BS1 and, subsequently, the method returns to Event 402 for normal state transmissions of UE pilot signal. If a determination is made that the attempt to borrow resources/channels or rearrange resources was unsuccessful, at Event 418, a communication is sent back to BS1 informing BS1 of the inability of BS2 to perform mitigating actions to correct the UE1 contaminated pilot channel.

If at Decision 412, a determination is made that the contaminated channel is a BS2 priority channel, at Event 418, BS2 sends a communication back to BS1 informing BS1 of that BS2 has priority over the contaminated channel (i.e., BS1 must performing mitigating action or stop using the contaminated channel as the UE1 pilot channel).

Referring to FIG. 6 shown is the orthogonal arrangement 500 of cells in a 2G or 3G communication network, in accordance with embodiments of the present invention. Specifically, FIG. 6 illustrates typical cell resource allocation in which cells designated A 502 share the same frequency and time resources, cells designated B 504 share the same frequency and time resources and cells designated C share the same frequency and time resources. Resources can be re-used or otherwise re-allocated with a rate of three (3). No neighboring cells share resources (e.g., cells designated A 502 do not share resources with cells designated B and C 504 and 506; cells designated B 504 do not share resources with cells designated A and C 502 and 506; and cells designated C do not share resources with cells designated A and B 502 and 504). Spectral efficiency for the pilot channel is deemed to be ⅓, with "zero" theoretical interference. Each cell type; A, B or C has a pool of pilot resources in which the BS corresponding to the cell has allocation priority (i.e., ownership rights over the use of the pilot resource/channel).

Referring to FIG. 7 shown is the orthogonal arrangement 600 of cells in a MaMi communication network, in accordance with embodiments of the present invention. Specifically, FIG. 7 illustrates that within the cell centers 602A, 604A and 606C of cells A, B and C the distance between neighboring cell centers is large enough such that UEs located in the cell centers 602A, 604A and 606A may any re-use/reallocation of frequency and time resource may be permitted (i.e., cells centers 602A for cells designated A share resources with cells designated A, B and C; cell centers 604A for cells designated B share resources with cells designated A, B and C; and cell centers 606A for cells designated C share resources with cells designated A, B and C). This universal re-use/reallocation within cell centers provides for a pilot spectral efficiency of one (1). While at the periphery (i.e., cell edge) 602B, 604B and 606B each cell has dedicated resources yielding a spectral efficiency for the pilot of ⅓. In total, the spectral efficiency improves with the area ratio between cell center and the cell periphery/edge, with "zero" theoretical interference.

Thus, systems, apparatus, methods, computer program products and the like described above provide for provide for standardized inter-base station reporting of pilot contamination for improved pilot channel re-use/re-allocation. The present invention detects possible pilot channel contamination in a user equipment and, in response to detecting the possible pilot signal confirmation, confirms the pilot channel contamination by requesting that the user equipment remain silent (i.e., not transmit) during a next frame designated for pilot signal transmission. If the BS confirms the pilot signal transmission by determining within the next frame, that one or more other user equipment, which are communicating with a neighboring second base station, are transmitting on a same channel as a pilot channel of the user equipment, then the base station sends a report to the neighboring base stations that indicates that the pilot channel being implemented by the user equipment is contaminated. Actions may be taken at the base station prior to sending the report or at the neighboring base stations upon receipt of the report to mitigate the contamination (i.e., re-use/re-allocate channel resources, rearrange allocation of channel resources or the like)

The invention is not limited to any particular types of devices/UEs. As used herein, a device may also be referred to as a UE, a system, or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for improving performance in a MaMi (Massive Multiple Input Multiple Output (MIMO)) communication network, the system comprising
    a first Base Station (BS1) in network communication with
        a first User Equipment (UE1), wherein at least one of the BS1 and the UE1 are configured to detect possible pilot channel contamination of the UE1 and, in response to detecting the possible pilot channel contamination, the BS1 is configured to transmit to the UE1 a request to forego transmission during a next frame designated for transmitting a pilot signal; and
    a plurality of second Base Stations (BS2) that neighbor the BS1 and are in network communication with one or more second User Equipment (UE2),
    wherein, BS1 is further configured to (i) determine within the next frame if one or more of the UE2s are transmitting on a same channel as a pilot channel of the UE1, and (ii) in response to determining that one or more of the UE2s are transmitting on the same channel, report to the BS2s that the pilot channel on which the UE1 is communicating is currently contaminated.

2. The system of claim 1, wherein the BS2s are configured to, in response to reporting to the BS2s that the pilot channel is currently contaminated, determine that one or more of the UE2s are currently communicating with the BS2 on the same channel as the pilot channel, and allocate a different channel resource to the one or more UE2s.

3. The system of claim 1, wherein the BS1 is further configured to, in lieu of reporting to the BS2s that the pilot channel is currently contaminated, allocate a different pilot channel resource to the UE1.

4. The system of claim 1, wherein the BS2s are further configured, in response to reporting to the BS2s that the pilot channel is currently contaminated, determine which one of the base stations (BS1 and BS2s) has priority over the pilot channel and allocate different channel resources at all other BSs than the base station having priority over the pilot channel.

5. The system of claim 1, wherein the BS1 is further configured to (i) determine that the BS1 has priority over the pilot channel and (ii) in response to determining that the BS1 has priority over the pilot channel, report to the BS2s that the pilot channel on which the UE1 is communicating is currently contaminated.

6. The system of claim 5, wherein the BS1 is further configured to determine that the BS1 has no available priority channels for allocating to the UE1 and (ii) in response to determining that the BS1 has no available priority channels for allocating to the UE1, report to the BS2s that the pilot channel on which the UE1 is communicating is currently contaminated.

7. The system of claim 1 wherein the UE1 or the BS1 is further configured to detect the possible pilot channel contamination of the UE1 by detecting an increase in one of uplink (UL) or downlink (DL) bit error rate (BER).

8. The system of claim 7, wherein the UE1 is further configured to detect the increase in downlink BER and transmit notification of the increase in BER to the BS1.

9. The system of claim 1, wherein the BS1 is further configured to, in response to determining that no UE2s are transmitting on the same channel, increase a power level to the UE1.

10. A method for improving performance in a MaMi (Massive Multiple Input Multiple Output (MIMO)) communication network, the method comprising:
- detecting, at one of a first User Equipment (UE1) or a first Base Station (BS1) within the communication network, possible pilot channel contamination of UE1;
- in response to detecting the possible pilot channel contamination, transmitting, from the BS1 to the UE1, a request for the UE1 to forego transmission during a next frame designated for transmitting a pilot signal;
- determining, at the BS1 within the next frame, if one or more second user equipment (UE2) that are communicating with a neighboring second base station (BS2) are transmitting on a same channel as a pilot channel of the UE1; and
- in response to determining that the one or more UE2s are transmitting on the same channel, reporting, by the BS1, to the one or more BS2s that the pilot channel on which the UE1 is communicating is currently contaminated.

11. The method of claim 10, further comprising in response to reporting to the BS2s that the pilot channel is currently contaminated, determining, at a BS2, that one or more UE2s are currently communicating with the BS2 on the same channel as the pilot channel, and allocating, by the BS2, a different channel resource to the one or more UE2s.

12. The method of claim 10, further comprising in lieu of reporting to the BS2s that the pilot channel is currently contaminated, allocating, by the BS1, a different pilot channel resource to the UE1.

13. The method of claim 10, further comprising in response to reporting to the BS2s that the pilot channel is currently contaminated, determining which one of the base stations (BS1 and BS2s) has priority over the pilot channel and allocating different channel resources at all other BSs than the base station having priority over the pilot channel.

14. The method of claim 10, further comprising determining that the BS1 has priority over the pilot channel and wherein reporting to the one or more BS2s occurs in response to determining that the BS1 has priority over the pilot channel.

15. The method of claim 14, further comprising determining that the BS1 has no available priority channels for allocating to the UE1 and wherein reporting to the one or more BS2s occurs in response to determining that the BS1 has no available priority channels for allocating to the UE1.

16. The method of claim 10, wherein detecting possible pilot channel contamination of the UE 1 further comprises detecting, at one of the UE1 or the BS1, an increase in one of uplink (UL) or downlink (DL) bit error rate (BER).

17. The method of claim 16, wherein detecting the increase in BER further comprises determining that the BER meets or exceeds a predetermined bit error rate threshold.

18. A method for improving performance in a MaMi (Massive Multiple Input Multiple Output (MIMO)) communication network, the method comprising:
- in response to detecting possible pilot channel contamination of first User Equipment (UE1), receiving, at the UE1, a request from a first base station (BS1) for the UE1 to forego transmission during a next frame designated for transmitting a pilot signal; and
- in response to receiving the request, foregoing, by the UE1, transmission of the pilot signal during the next frame,
- wherein the BS1 (i) determines within the next frame that one or more second user equipment (UE2), which are communicating with a neighboring second base station (BS2) are transmitting on a same channel as a pilot channel of the UE1 and (ii) in response to determining that the one or more UE2s are transmitting on the same channel, reports to the one or more BS2s that the pilot channel on which the UE1 is communicating is currently contaminated.

19. The method of claim 18, further comprising in lieu of reporting to the BS2s that the pilot channel is currently contaminated, allocating, by the BS1, a different pilot channel resource to the UE1.

20. The method of claim 18, wherein detecting possible pilot channel contamination of the UE 1 further comprises detecting, at one of the UE1 or the BS1, an increase in one of uplink (UL) or downlink (DL) bit error rate (BER).

\* \* \* \* \*

UNITED STATES PATENT AND TRADEMARK OFFICE
CERTIFICATE OF CORRECTION

PATENT NO. : 9,838,933 B2
APPLICATION NO. : 14/796598
DATED : December 5, 2017
INVENTOR(S) : Erik Bengtsson Page 1 of 1

It is certified that error appears in the above-identified patent and that said Letters Patent is hereby corrected as shown below:

In the Claims

Column 15, Line 5, Claim 10, replace "B51" with "BS1".

Signed and Sealed this
Thirteenth Day of February, 2018

Andrei Iancu
*Director of the United States Patent and Trademark Office*